(12) United States Patent
Matsubara

(10) Patent No.: US 9,916,029 B2
(45) Date of Patent: Mar. 13, 2018

(54) SENSOR CONTROLLER, SENSOR DEVICE INCLUDING SENSOR CONTROLLER, ELECTRONIC APPARATUS EQUIPPED WITH SENSOR DEVICE, AND APPLICATION SOFTWARE RECOVERY METHOD

(71) Applicant: Wacom Co., Ltd., Saitama (JP)

(72) Inventor: Masaki Matsubara, Ibaragi (JP)

(73) Assignee: Wacom Co., Ltd., Saitama (JP)

( * ) Notice: Subject to any disclaimer, the term of this patent is extended or adjusted under 35 U.S.C. 154(b) by 78 days.

(21) Appl. No.: 14/574,048

(22) Filed: Dec. 17, 2014

(65) Prior Publication Data

US 2015/0220203 A1 Aug. 6, 2015

(30) Foreign Application Priority Data

Feb. 3, 2014 (JP) ................................. 2014-018373

(51) Int. Cl.
  *G06F 3/041* (2006.01)
  *G06F 11/14* (2006.01)
  *G06F 9/445* (2018.01)
  *G06F 3/0354* (2013.01)

(52) U.S. Cl.
  CPC ........ *G06F 3/0416* (2013.01); *G06F 3/03547* (2013.01); *G06F 8/67* (2013.01); *G06F 11/1402* (2013.01)

(58) Field of Classification Search
  CPC ............................ G06F 3/0416; G06F 11/1402
  See application file for complete search history.

(56) References Cited

U.S. PATENT DOCUMENTS

| 4,819,232 A * | 4/1989 | Krings ................ G06F 11/2028 714/13 |
| 6,883,060 B1 * | 4/2005 | Hayama ............... G11C 16/102 711/103 |
| 2010/0313192 A1 * | 12/2010 | Natsume ................... G06F 8/65 717/168 |

(Continued)

FOREIGN PATENT DOCUMENTS

JP 2013003757 A 1/2013

OTHER PUBLICATIONS

Extended European Search Report dated Jun. 12, 2015, for corresponding EP Application No. 15152378.4-1954, 8 pages.

*Primary Examiner* — Bryan Earles
(74) *Attorney, Agent, or Firm* — Seed Intellectual Property Law Group LLP

(57) ABSTRACT

Disclosed herein is a sensor controller that controls a sensor device that gives input information to a computer. The sensor controller includes a non-volatile memory that stores application software for accepting and processing touch input, an activation program that checks an activation state of the application software at a time of activation, a recovery program that executes recovery processing of the application software, and information indicating the activation state. The sensor controller further includes a processor that activates the activation program at the time of activation and executes the recovery program when the activation state indicates that activation of the application software is a second or subsequent activation and indicates that touch input has not been processed normally by the application software at a time of past activation.

19 Claims, 10 Drawing Sheets

(56) References Cited

U.S. PATENT DOCUMENTS

| | | | |
|---|---|---|---|
| 2011/0131563 A1* | 6/2011 | Ohama | G06F 8/65 |
| | | | 717/168 |
| 2011/0202936 A1* | 8/2011 | Todoroki | G06F 3/0481 |
| | | | 719/329 |
| 2013/0125107 A1 | 5/2013 | Bandakka et al. | |
| 2013/0132771 A1* | 5/2013 | Pan | G06F 9/44 |
| | | | 714/15 |
| 2013/0222288 A1 | 8/2013 | Lim et al. | |
| 2014/0059335 A1* | 2/2014 | Oota | G06F 11/0703 |
| | | | 713/1 |

* cited by examiner

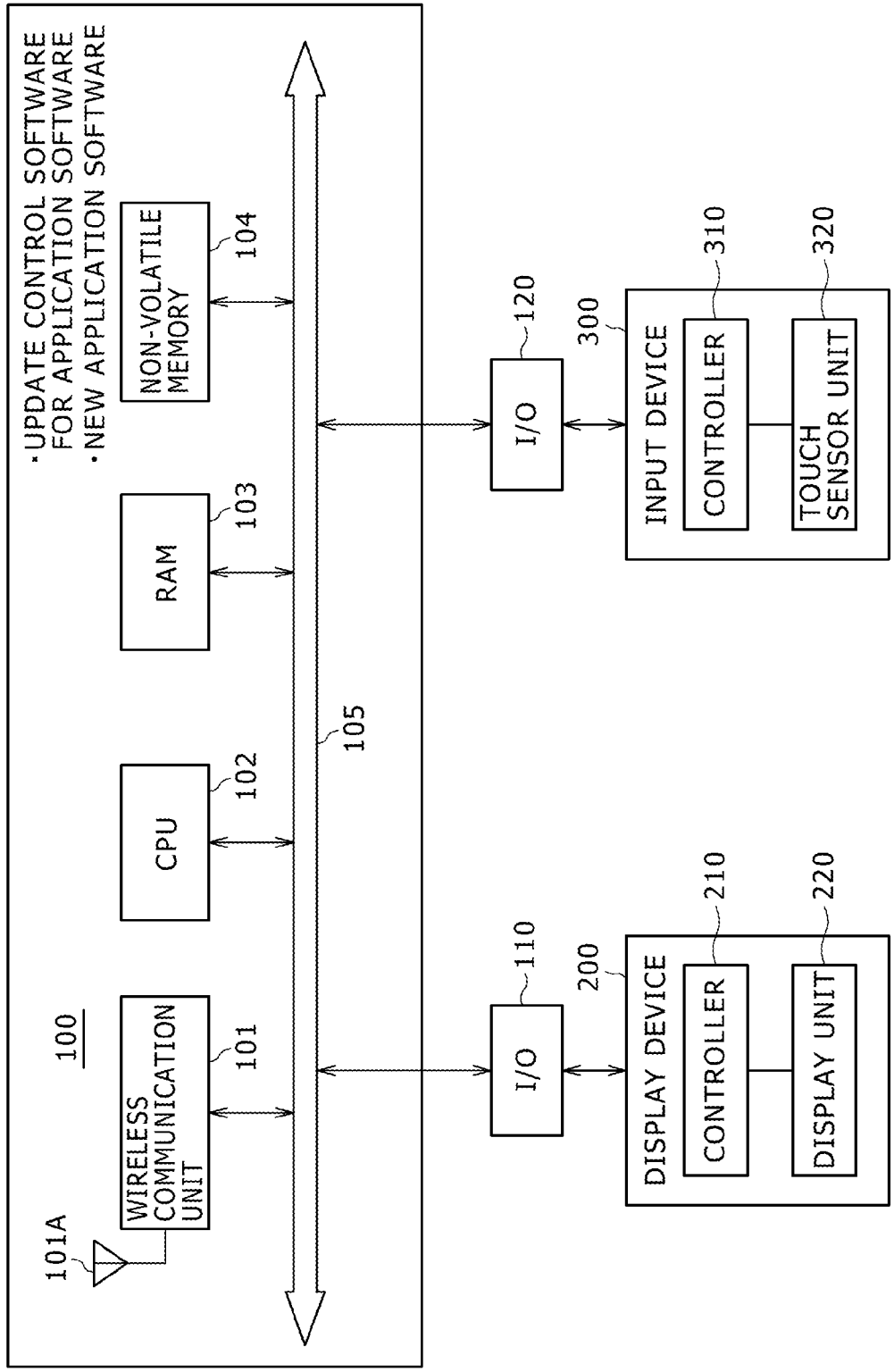

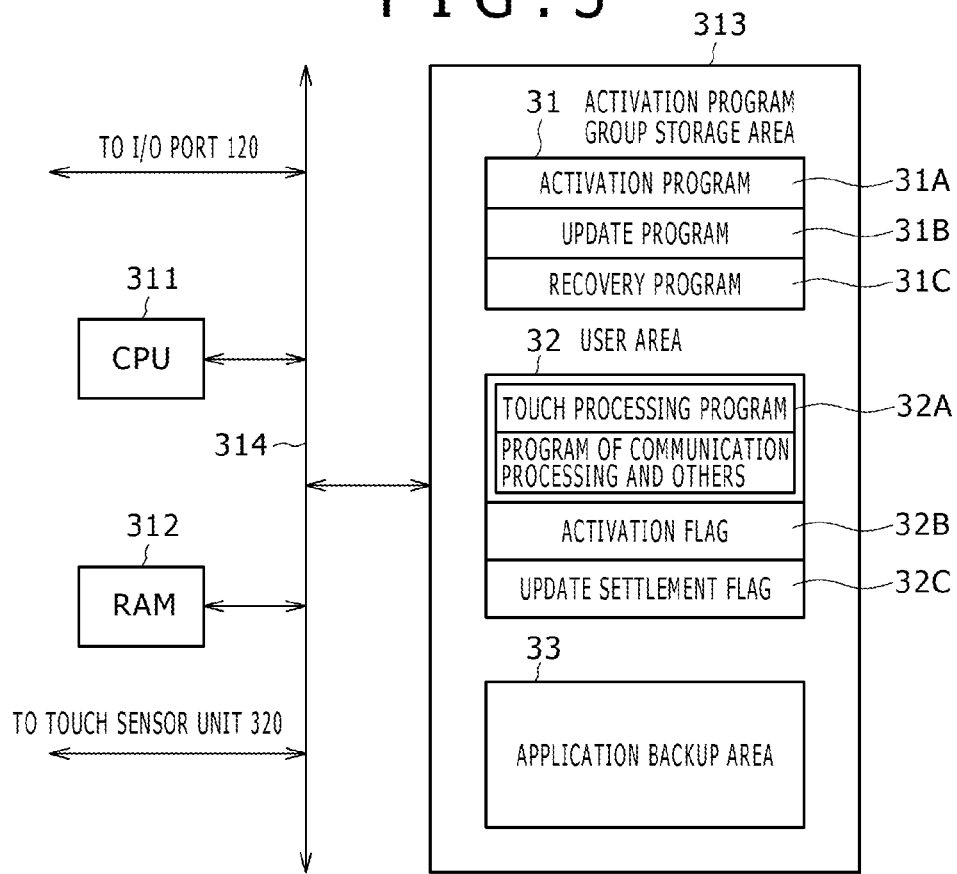

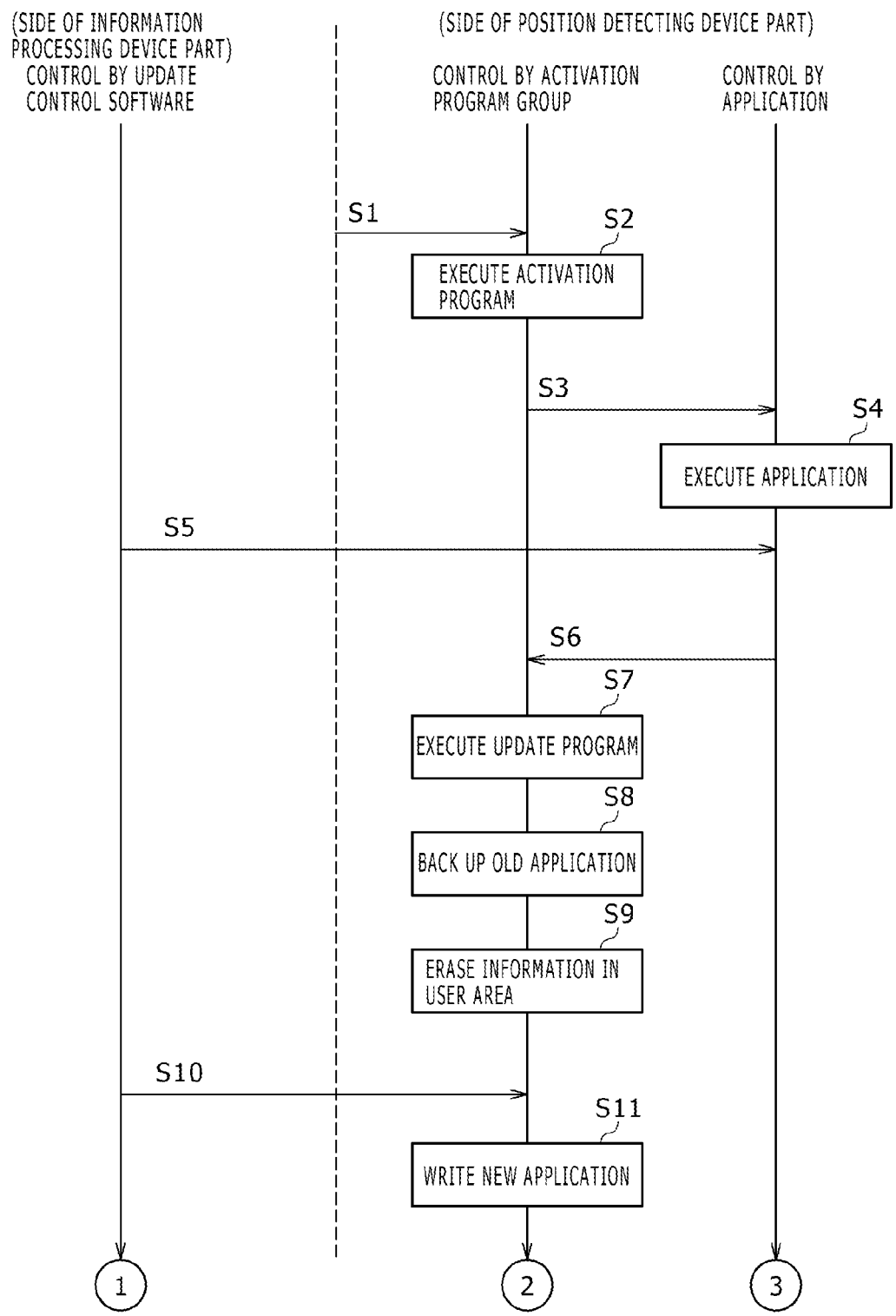

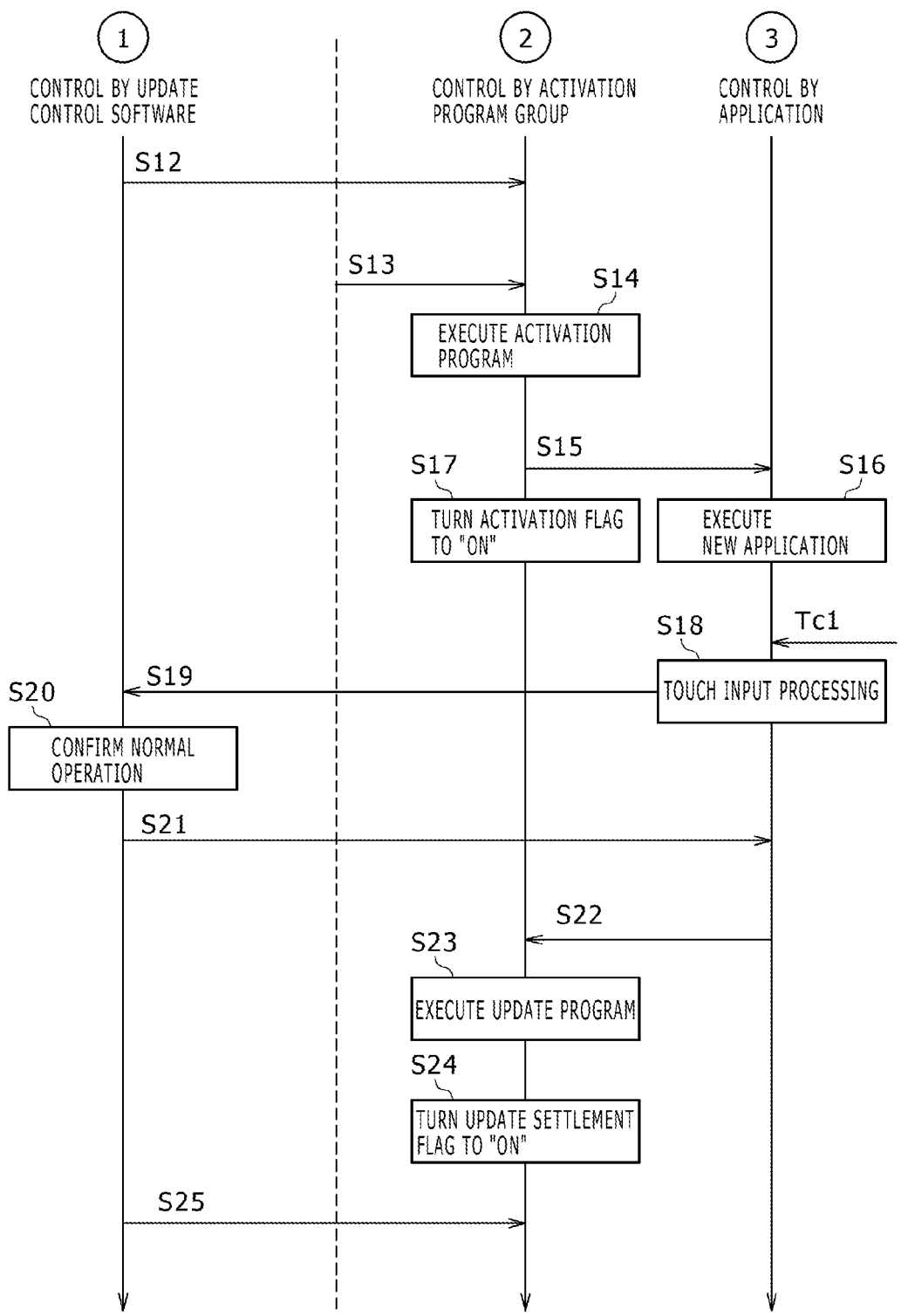

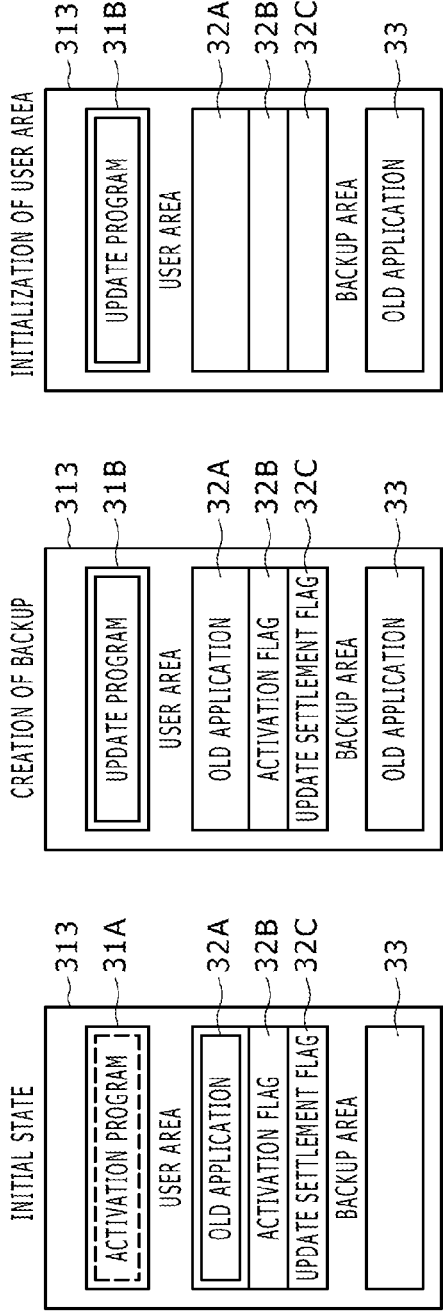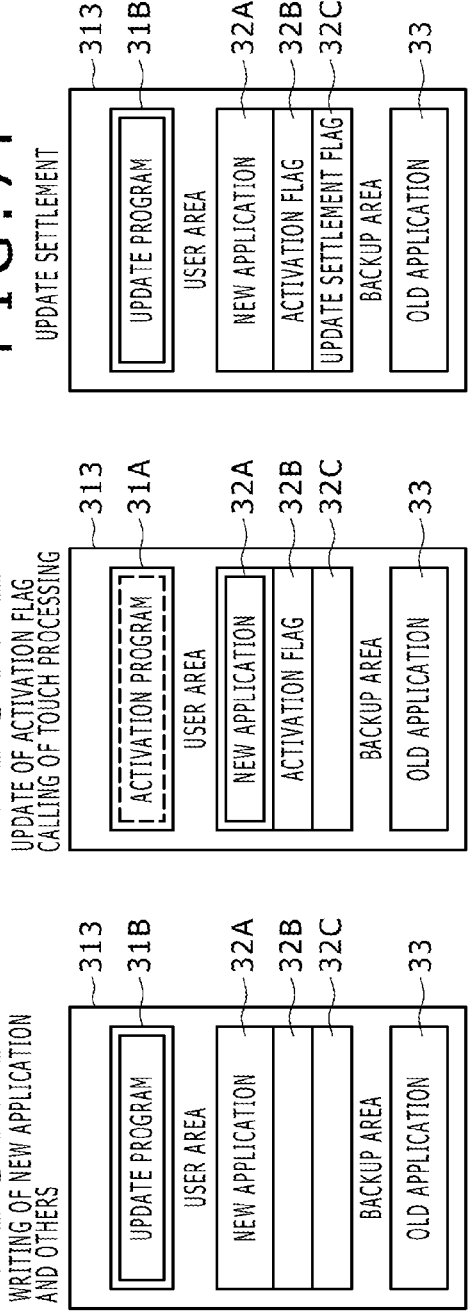

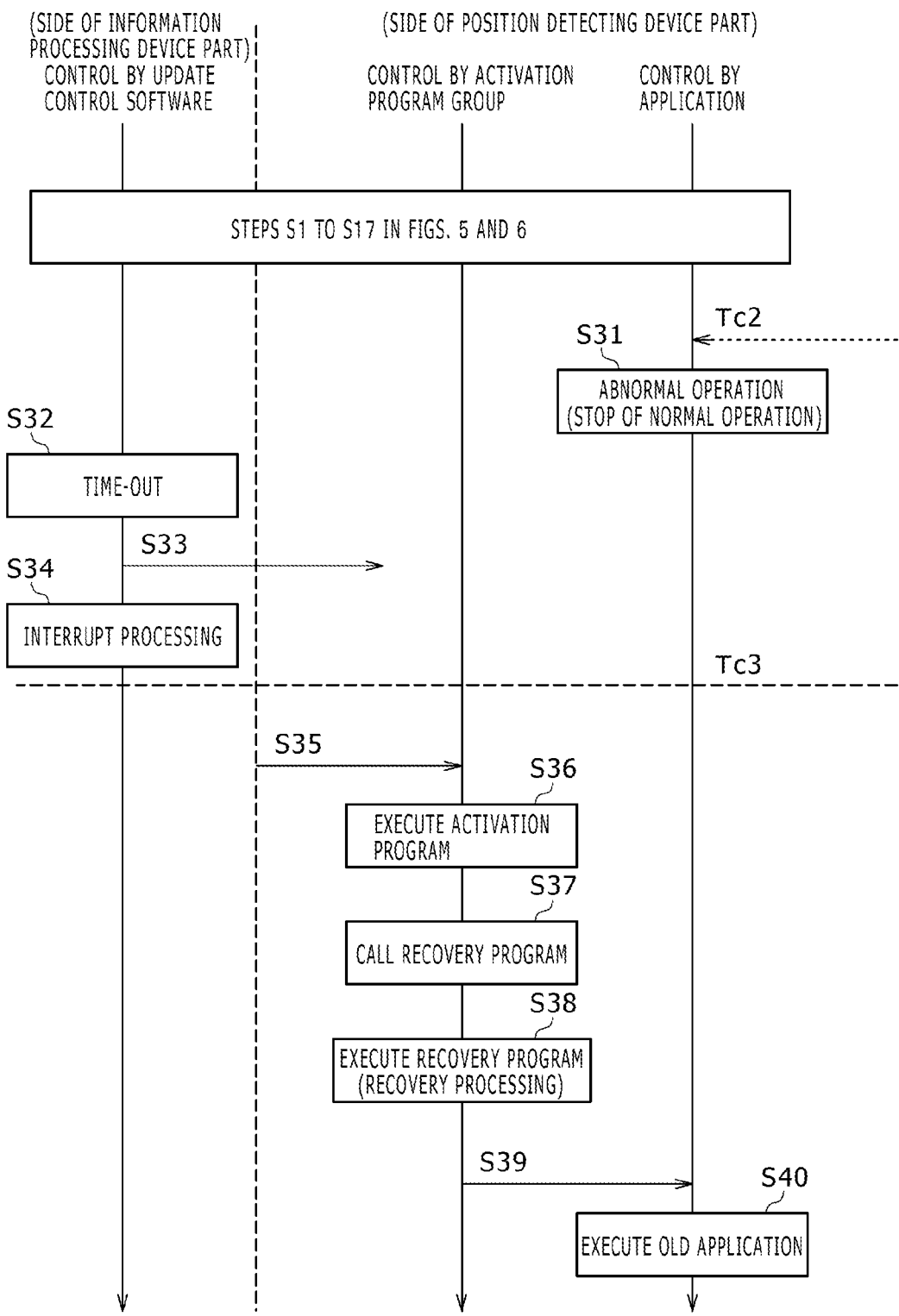

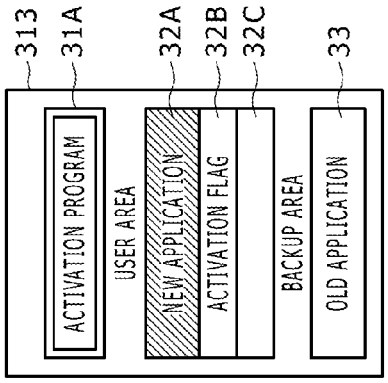
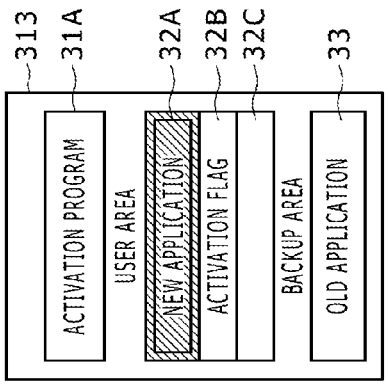
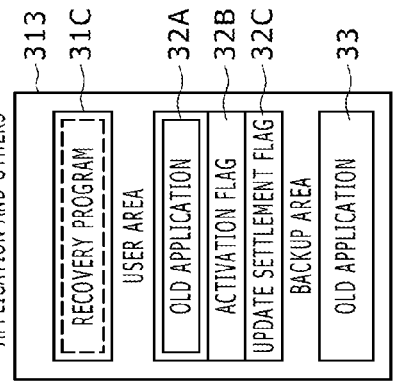
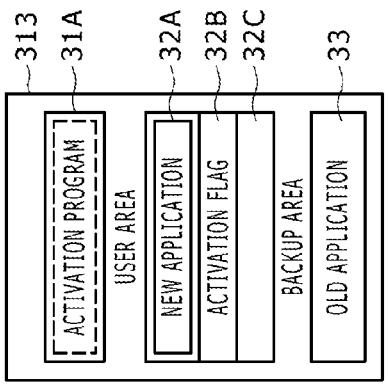
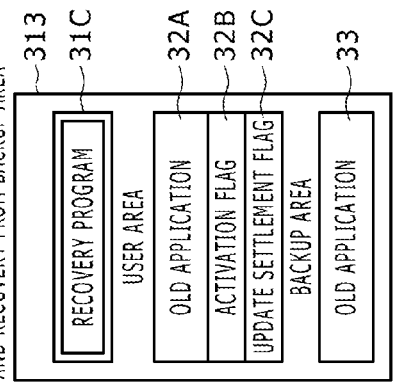

SENSOR CONTROLLER, SENSOR DEVICE INCLUDING SENSOR CONTROLLER, ELECTRONIC APPARATUS EQUIPPED WITH SENSOR DEVICE, AND APPLICATION SOFTWARE RECOVERY METHOD

BACKGROUND

Technical Field

The present invention relates to a device and a method that allows a touch input device, which is used as input means for an electronic apparatus, to determine whether or not recovery processing of application software of the touch input device is necessary and execute recovery processing of the application software of the touch input device.

Description of the Related Art

Today, apparatuses with integrated touch input devices not only serve as mobile phone terminals (e.g., smartphones) and small terminals (e.g., electronic book readers), but also serve as personal computers (e.g., tablet PCs). For many these apparatuses with integrated touch input devices, most, if not all, of their operations are carried out by touch input and cannot be carried out by alternative input means.

Many of these touch input devices execute advanced internal processing and have many functions that simple input devices, such as mice and keyboards, do not. Consequently, touch input devices often include update functionality to update their firmware. Furthermore, many touch input devices can be updated while being incorporated in an information processing device (e.g., terminal) for user convenience. When a touch input device is incorporated in an information processing device and the touch input device's firmware is updated, normal operation of the information processing device can be continued if the firmware is updated properly and the touch input device operates correctly based on the updated firmware. However, if the update of the firmware fails or is defective, the touch input device may become inoperable. As such, if the touch input device is the sole input means, a user will be unable to perform any operation. Even return of the firmware of the touch input device to its original state would be impossible.

One common measure to prevent a touch input device from becoming inoperable is preventing update processing of firmware from being interrupted. Another common measure is verifying that new firmware for an update correctly operates prior to update processing. However, it is difficult to completely eliminate the possibility that the touch input device becomes inoperable.

Japanese Patent Laid-open No. 2013-3757, hereinafter Patent Document 1, discloses an invention relating to an information processing device that prevents a touch input device from being inoperable after a firmware update. The touch input device is included in the information processing device and includes a touch panel 21, a CPU 22, and a volatile memory 23. Every time the information processing device is powered on, a data processing unit 10 of the information processing device supplies firmware stored in a ROM 13 of the data processing unit to the touch input device by communication via a bus 4. The firmware for the touch input device is written to the volatile memory by the CPU and is then executed by the CPU, resulting in a functional touch input device.

Old firmware, in addition to new firmware, is also held in the ROM of the data processing unit when the firmware for the touch input device is updated. If the new firmware is executed in the touch input device and normal data is not returned from the touch input device to the data processing unit in a predetermined time, the data processing unit supplies the old firmware from the ROM of the data processing unit to the touch input device and activates the old firmware. As such, a situation in which the touch input device becomes inoperable is avoided.

As described above, the firmware for the touch input device is stored in the ROM of the data processing unit of the information processing device. Therefore, the information processing device has a configuration in which the firmware is provided from the data processing unit to the touch input device every time the information processing device is powered on. Accordingly, the update function for the firmware for the touch input device and the recovery function for the firmware for the touch input device are implemented as functions of the data processing unit of the information processing device, not as functions of the touch input device. That is, the update function and the recovery function for the firmware for the touch input device work only as functions of the entire information processing device, including the data processing unit and the touch input device.

In addition, if the firmware is provided from the data processing unit of the information processing device to the touch input device every time the information processing device is powered on, additional time for the provision of the firmware is needed for every power activation and the start-up time of the information processing device is increased. To address this problem, it would be effective to hold the firmware for the touch input device in a memory of the touch input device.

BRIEF SUMMARY

The update of firmware of the touch input device that is stored in the memory that is included in the touch input device is considered below. The update of the firmware for the touch input device may be carried out by the data processing unit of the information processing device. However, the touch input device may become inoperable because writing of the firmware to the memory of the touch input device fails or because new firmware written to the memory of the touch input device is defective.

The firmware for the touch input device includes software for communication processing, performing communication with the data processing unit, and processing of information provided by the data processing unit to the volatile memory. If the software is not properly written or is defective, control of the touch input device by the data processing unit of the information processing device via communication becomes impossible. In such a case, the data processing unit disclosed in Patent Document 1 cannot return firmware to the old firmware, instead of the new firmware. As such, special handling (e.g., recovering the old firmware in the memory of the touch input device by using a dedicated device) is necessary and rapid recovery of the touch input device is impossible.

In view of the above, an aspect of this invention is to perform recovery processing based on a determination by a touch input device, without an instruction from an information processing device, when application software stored in a memory of the touch input device is not functioning properly because of update processing.

To solve the above-described problems, a sensor controller is used to control a sensor device that provides input information to a computer. The sensor controller includes a non-volatile memory that includes application software for accepting and processing touch input, an activation program that checks an activation state of the application software at a time of activation, a recovery program that executes recovery processing of the application software, and information indicating the activation state. The sensor controller further includes a processor that activates the activation program at the time of activation, and executes the recovery program if the activation state indicates that activation of the application software is a second or subsequent activation and indicates that touch input has not been normally processed by the application software at a time of past activation.

Accordingly, the sensor controller includes the non-volatile memory and the processor. Firmware and the information indicating the activation state are stored in the non-volatile memory. The firmware includes at least (1) the application software for accepting and processing touch input, (2) the activation program that checks the activation state of the application software at the time of power activation, and (3) the recovery program that executes the recovery processing of the application software. The information indicating the activation state includes information indicating (A) whether or not activation of the application software is a second or subsequent activation, and (B) whether or not touch input has been processed normally by the application software at a time of past activation.

At the time of power activation, the processor activates the activation program and checks the activation state of the application software by the function of the activation program. If this activation state indicates that activation of the application software is a second or subsequent activation and touch input has not been processed normally by the application software at a time of past activation, the processor executes the recovery processing of the application software by the recovery program.

In this manner, the processor that has executed the activation program at the time of power activation can check the activation state of the application in the non-volatile memory and determine whether or not recovery of the application software is necessary. If the processor determines that the recovery is necessary, the processor executes the recovery program to perform the recovery processing of the application software. Therefore, it is possible that the sensor controller carries out the recovery of the application software for itself.

According to this invention, when application software held in a memory of the touch input device is not functioning properly because of update processing, recovery processing can be executed based on a determination by the touch input device, without an instruction from an information processing device.

BRIEF DESCRIPTION OF THE SEVERAL VIEWS OF THE DRAWINGS

FIG. 2 is a block diagram for explaining one example of the overall configuration of the tablet information terminal;

FIG. 3 is a block diagram for explaining a configuration example of a controller of an input device;

FIG. 4 is a diagram for explaining a use mode of information of an activation flag area and information of an update settlement flag area;

FIG. 5 is a diagram showing a flow of processing when update processing of an application of the input device is executed in the tablet information terminal;

FIG. 6 is a diagram showing a flow of the processing following FIG. 5;

FIGS. 7A to 7F are diagrams showing states of a non-volatile memory when the processing of FIGS. 5 and 6 is executed;

FIG. 8 is a diagram showing a flow of processing when update processing of the application of the input device is executed in the tablet information terminal;

FIGS. 9E and 9G to 9J are diagrams showing the states of the non-volatile memory when the processing of FIG. 8 is executed;

DETAILED DESCRIPTION

An embodiment of device and method of this invention will be described below with reference to the drawings.

Configuration of Tablet Information Terminal 1

One Example of Appearance of Tablet Information Terminal 1

Figure 1:
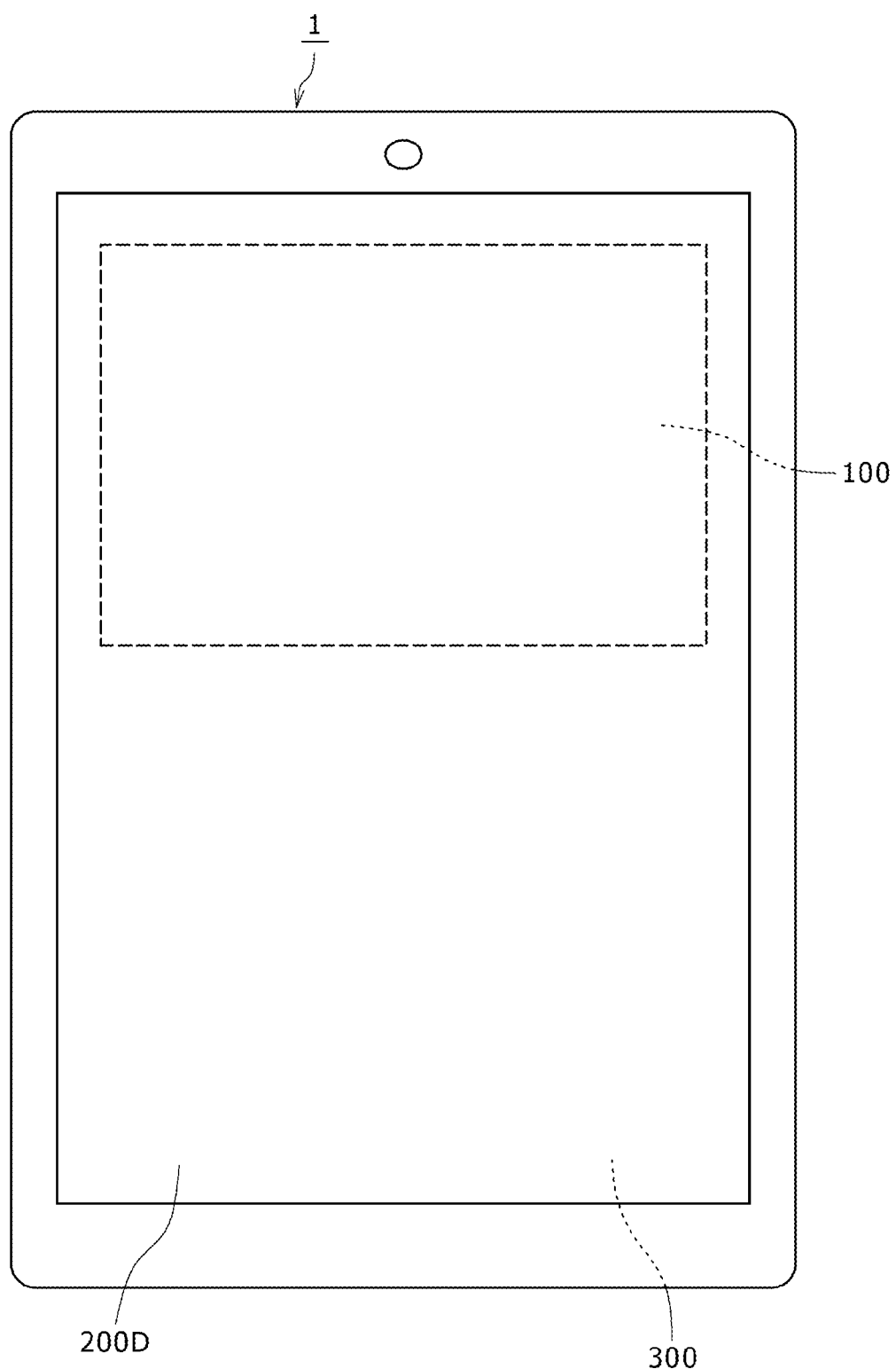
FIG. 1 is a diagram showing one example of an appearance of a tablet information terminal.

FIG. 1 is a diagram showing one example of the appearance of a tablet information terminal 1 of this embodiment. The tablet information terminal 1 has a configuration in which, from its front surface, a comparatively large display screen 200D, such as a liquid crystal display (LCD), of a display device 200 is exposed. An input device (touch input device) 300 is mounted on a back part of the display screen 200D. The input device 300 has a touch sensor unit that covers the entire display screen 200D so that an indicated position on the display screen 200D can be detected anywhere on the display screen 200D. Furthermore, inside the casing of the tablet information terminal 1, an information processing device part 100 that is connected to the display device 200 and the input device 300 and executes various kinds of information processing is provided.

As described above, the tablet information terminal 1 is an information processing device in which the input device 300 is a sole input device (input equipment). Suppose that, in the tablet information terminal 1, a position indication operation is carried out with an indicator, such as a finger of a user or a pen coordinate indicator, on the display screen 200D. In this case, a central processing unit (CPU), included in the input device 300, identifies the indicated position on the display screen 200D based on a detection output from the touch sensor unit of the input device 300 provided at the back part of the display screen 200D. Information showing the indicated position identified by the CPU is supplied to the information processing device part 100 so that processing according to the information can be executed.

One Example of Overall Configuration of Tablet Information Terminal 1

FIG. 2 is a block diagram for explaining one example of the overall configuration of the tablet information terminal 1 of this embodiment. The tablet information terminal 1 is formed by coupling the display device 200 to the information processing device part 100 via an input/output (I/O) port 110, and coupling the input device 300, as the input equipment, to the information processing device part 100 via an I/O port 120. The information processing device part 100 controls the tablet information terminal 1 and functions as a host device part for the touch input device.

The information processing device part 100 is formed by coupling a wireless communication unit 101 in which a transmission/reception antenna 101A is coupled, a CPU 102, a random access memory (RAM) 103, and a non-volatile memory 104 to each other via a bus 105.

The wireless communication unit 101, to which the transmission/reception antenna 101A is connected, implements, for example, a function to connect to the Internet via a neighboring base station.

The CPU 102 executes various programs and controls the respective units of the information processing device part 100, the display device 200, and the input device 300 connected to the information processing device part 100.

The RAM 103 is mainly used as a work area. For example, the RAM 103 temporarily stores an intermediate result of processing.

The non-volatile memory 104 stores and holds information that should be held after the tablet information terminal 1 is powered off, such as various programs executed in the CPU 102, programs provided for upgrading functions, and various pieces of setting information. Update control software for updating application software of the input device 300, new application software for the input device 300, and so forth are also stored in the non-volatile memory 104.

The information processing device part 100 can acquire the update control software for an application for the input device 300 and a new application for the input device 300 from, for example, a predetermined server on the Internet via the transmission/reception antenna 101A and the wireless communication unit 101.

The I/O ports 110 and 120 are input/output ports compatible with a predetermined communication system, such as the inter-integrated circuit (I2C) or a universal serial bus (USB). The I/O port 110 enables data transmission and reception between the information processing device part 100 and the display device 200. The I/O port 120 enables data transmission and reception between the information processing device part 100 and the input device 300.

The display device 200 is, for example, a thin display unit (display element), such as a liquid crystal display (LCD) or an organic electro-luminescence (EL) display.

The input device 300 includes a controller 310 and a touch sensor unit 320. The controller 310 is a microprocessor that includes a CPU and a non-volatile memory. The touch sensor unit 320 is an input sensor for any one of a variety of systems, such as a capacitive system (or an electromagnetic induction system). The input device 300 detects the position of contact by a finger of a user, or the like, on the touch sensor unit 320 by using the controller 310, and supplies input data of the contact position and so forth to the information processing device part 100. The information processing device part 100 includes a driver that processes the input data from the input device 300 and so forth, and executes processing according to the contact position from the input device 300.

Configuration Example of Controller 310 of Input Device 300

FIG. 3 is a block diagram for explaining a configuration example of the controller 310 of the input device 300. As shown in FIG. 3, the controller 310 is formed by coupling a CPU 311, a RAM 312, and a non-volatile memory 313 to each other via a bus 314. Furthermore, the I/O port 120 and the touch sensor unit 320 are coupled to the bus 314.

The CPU 311 executes firmware to control the respective units so that the input device 300 may function as the input equipment of the tablet information terminal 1. The RAM 312 is used mainly as a work area. For example, the RAM 312 temporarily stores an intermediate result of processing. The non-volatile memory 313 stores and holds the firmware and others that need to be stored even after the tablet information terminal 1 is powered off.

Generally speaking, in this embodiment, the firmware used in the input device 300 includes application software and an activation program group for activating the application software.

The application software enables the input device 300 to function as the input equipment of the tablet information terminal 1. The application software includes a touch processing program and a program for communication and other processing.

The touch processing program identifies a position of a user's touch on the touch sensor unit 320 based on a detection output from the touch sensor unit 320. The program for communication and other processing transmits coordinate information, indicating the identified touch position on the touch sensor unit 320, to the information processing device part 100, and receives a control signal from the information processing device part 100 to process it. Hereinafter, for simplification purposes, the application software, including the touch processing program and the program for communication and other processing, will be referred to as the application.

The activation program group includes an activation program, an update program, and a recovery program. The activation program checks the activation state of the application at the time of power activation and activates the application. The update program communicates with the information processing device part 100 to execute update processing of a new application. Specifically, the update program performs a backup of an old application and writing of the new application to a predetermined area. The recovery program executes recovery processing by setting the old application as the activation target if the new application has not normally operated.

The activation program, the update program, and the recovery program are basic programs used to ensure that the application is functioning properly as described above and are normally not updated. In contrast, the application is updated often to improve the functions of the input device 300 and so forth. Specifically, the application is updated by the information processing device part 100 at an appropriate timing to improve the detection sensitivity of the input device 300 for the indicated position, the detection range of the indicated position, and so forth.

As shown in FIG. 3, an activation program group storage area 31 and a user area 32 are set in the storage area of the non-volatile memory 313 that is included in the controller 310 of the input device 300. Furthermore, an application backup area 33, where an old application before update is saved, is set in the non-volatile memory 313. The non-volatile memory 313 is typically a non-volatile storage area called an EEPROM or flash memory. In this embodiment, for example, the non-volatile memory 313 is a flash memory in which data is erased by pages, blocks, or the like, and has the three data storage areas stored in four pages as segments, for example. The activation program group storage area 31 is created in the first page of the first segment, the user area 32 is created in the second page of the second segment, and the application backup area 33 is created in the third segment (third page and fourth page) as a save area. Furthermore, the non-volatile memory 313 has a configuration in which information can be erased by pages.

The activation program group storage area 31 has an activation program area 31A, an update program area 31B, and a recovery program area 31C. The activation program, the update program, and the recovery program are stored in the activation program group storage area 31. As previously described, the activation program, the update program, and the recovery program are programs that implement basic functions, such as activation, update, and recovery, respectively, of the application and are, therefore, not normally updated. That is, the respective programs stored in the activation program group storage area 31 are not updated in a state in which a general user (end-user) has the tablet information terminal 1 on hand.

The user area 32 includes an application area 32A, an activation flag area 32B, an update settlement flag area 32C, and so forth.

The application area 32A includes the application of the execution target. The application includes the touch processing program, the program of communication processing and others, as described above. The application of the execution target may be updated at appropriate times, even in the state in which a general user has the tablet information terminal 1 on hand, to improve the functions of the input device 300 as described above.

The activation flag area 32B includes information, written by the activation program or the update program executed by the CPU 311, indicating whether an activation of the application stored in the application area 32A is a first activation or is a second or subsequent activation. When the activation program activates the application stored in the application area 32A for the first time, information indicating that this application has been already activated (i.e., the next activation is a second or subsequent activation) is written.

The update settlement flag area 32C includes information that indicates whether or not touch input has been processed normally by the application that is currently the activation target and is stored in the application area 32A, and that is written when the application is activated and normal operation can be confirmed. For example, suppose that it can be confirmed that a new application is operating normally after update processing of the application. In this case, information indicating, at a time of a subsequent activation, that it has been confirmed that the application functioned normally (as a history so that the information may be referenced at a time of activation) is written to the update settlement flag area 32C by the function of the update program executed by the CPU 311.

An old application that is stored in the application area 32A and has been used thus far is saved in the application backup area 33. The old application is stored when the application stored in the application area 32A is updated to a new application. This backup processing of the old application is executed by the function of the update program executed by the CPU 311.

As described above, the input device 300 of this embodiment includes the firmware. Therefore, the application, at least, often needs updating to improve the functions of the input device 300 and so forth. In the case of updating the application, there is a possibility that the update processing fails halfway or the updated application itself has a defect and does not function normally. If the program of communication processing and others included in the application involves a defect, even when the input device 300 has a library of the program actually used for communication in a protected area, activation itself of this program becomes impossible. Consequently, communication with the information processing device part 100 becomes impossible and recovery processing cannot be performed. Accordingly, there is no measure to recover the firmware.

Furthermore, even if a one-bit flag indicating whether or not recovery processing is necessary for the touch input device is provided in the memory of the touch input device, the one-bit information cannot be updated to indicate that recovery processing is necessary from the information processing device when recovery processing is necessary. This is because it becomes impossible to write the one-bit information indicating that the recovery processing is necessary from the information processing device to the touch input device when the touch input device is not functioning normally. Therefore, the information for causing the touch input device to make a self-determination as to whether or not the recovery processing is necessary at the time of activation cannot be indicated by the simple one-bit necessity/non-necessity flag (two states).

For the input device 300 of this embodiment, recovery of the application in the input device 300 is enabled by the functions of the activation program, the update program, and the recovery program. Furthermore, the information of the activation flag area 32B and the information of the update settlement flag area 32C (i.e., two flags) are used by these programs to indicate the activation-state information used to determine whether or not recovery is necessary for the touch input device. FIG. 4 is a diagram for explaining a use mode of the information of the activation flag area 32B and the information of the update settlement flag area 32C.

Various modes can be employed for the information written to the activation flag area 32B and the information written to the update settlement flag area 32C. For example, flag information that is set to "On" if the application has been activated and set to "Off" if the application has not yet been activated can be written to the activation flag area 32B. Also, flag information that is set to "On" if the application is functioning normally and set to "Off" if the operation of the application is abnormal can be written to the update settlement flag area 32C.

For simplification purposes, the description of the example shown in FIG. 4 assumes that flag information of "On" or "Off" is written to the activation flag area 32B and the update settlement flag area 32C as described above. When a new application is stored in the application area 32A of the user area 32, the activation flag of the activation flag area 32B and the update settlement flag of the update settlement flag area 32C are both set to an "Off" ("1") state (erased state, or initial state (a)). For example, if the non-volatile memory 313 is a flash memory, an erased state indicating the state (a) may be implemented by the activation flag area 32B and the update settlement flag area 32C being both erased (both set to "1" meaning erased) by an erasure operation in units of pages or blocks. When the activation program executed by the CPU 311 activates the application stored in the application area 32A for the first time, the activation flag of the activation flag area 32B is set to "On" ("0") by the function of the activation program. Furthermore, if it is confirmed that the application is operating normally by the update program, the update settlement flag of the update settlement flag area 32C is set to "On" ("0") by the function of the update program executed by the CPU 311. For example, if the non-volatile memory 313 is a flash memory, the shift to "On" can be implemented by setting the value of the bit, included in a page or block, set to the erased state thus far from the erased state to the programmed (or "On") state (i.e., turning the value from "1" to "0"). See "NORMAL OPERATION" state (c) in FIG. 4.

Thus, at the time of activation, the CPU 311, which has executed the activation program, refers to the information of the activation flag area 32B and the update settlement flag area 32C in the user area 32.

(c) The activation flag set to "On" and the update settlement flag set to "On" (third state) at the time of activation indicate a "normal operation" state in which the activation of the application stored in the application area 32A is a second or subsequent activation and the application has operated normally. In this case, the CPU 311 that has executed the activation program carries out normal operation of executing the application stored in the application area 32A by the function of the activation program ((c) of FIG. 4).

(b) The activation flag set to "On" and the update settlement flag set to "Off" at the time of activation indicate a state in which the activation of the application software stored in the application area 32A is a second or subsequent activation, but the application software did not operate normally when being activated a previous time (second state). In this case, the CPU 311 that is executing the activation program calls and executes the recovery program, instead of the activation program. The CPU 311 that has executed the recovery program carries out a series of recovery processing including recovering an old application saved in the application backup area 33, as will be described, to make it ready to be activated instead of the new application that is stored in the application area 32A and has not operated normally ((b) of FIG. 4).

(a) The activation flag set to "Off" and the update settlement flag set to "Off" (first state) indicate an initial state in which the application stored in the application area 32A has never operated. ((a) of FIG. 4). In this case, the CPU 311 that has executed the activation program reads out and executes the application stored in the application area 32A by the function of the activation program and carries out an operation of setting the activation flag of the activation flag area 32B from "Off" to "On" (from "1" to "0").

In this manner, information that allows the activation program to discriminate, at the time of activation, between the three states (the first state, second state, and third state) is held at a location that is accessible by the activation program at the time of activation.

A fourth state, in which the activation flag is set to "Off" and the update settlement flag is set to "On" ((d) of FIG. 4), is a state that cannot occur considering the functions of the update program and the activation program (i.e., a state in which the application has not yet been activated and yet has operated normally cannot occur). Thus, processing for this case normally does not need to be prescribed in advance. In this case, when the non-volatile memory 313 is a flash memory capable of erasure only in units of blocks or pages and the areas in which the activation flag and the update settlement flag are recorded are stored in the same block or page, the following three states can be realized without excess and deficiency: the state in which a page is erased and two bit values are both set to "1" ("Off" or "erased") as the first (initial) state (a); the state in which only the area of the activation flag is set to "0" ("On" or "programmed") as the second state (b); and the state in which both the activation flag and the update settlement flag are set to "0" ("On" or "programmed") as the third state (c), and the fourth state that does not occur. As such, this configuration is preferable.

However, if the fourth state occurs for any reason, there would be some kind of failure. Therefore, when state (d) occurs, processing of activating the application stored in the application area 32A may be executed, after clearing the activation flag area 32B and the update settlement flag area 32C. The irregular processing in the case of (d) may be executed by, for example, the function of the activation program executed by the CPU 311.

As described above, the input device 300 of this embodiment has a configuration in which the firmware is held in the non-volatile memory 313 of the input device 300. Therefore, there is a need to handle errors caused by an update of the application included in the firmware. As such, as described with reference to FIG. 3, the input device 300 has a configuration in which an old application is saved in the application backup area 33.

Moreover, the input device 300 includes the activation flag area 32B and the update settlement flag area 32C that provide information for the activation program to determine whether or not an error has been caused by an updated new application. Immediately after activation (at the time of power activation), the activation program checks the information stored in the activation flag area 32B and the update settlement flag area 32C. If it is determined that the application software of the activation target has not operated normally, the recovery program is executed to change the activation target from the application to the old application.

Update Processing of Application of Input Device 300

The update processing of the application of the input device 300 of this embodiment is described with reference to FIGS. 5 to 9J. As described by using FIG. 2, various programs, including the update control software for the application software stored in the non-volatile memory 104, are operated by the CPU 102 of the information processing device part (terminal main body part) of the tablet information terminal 1. Due to the functioning of the update control software, the update processing of the application of the input device 300 is executed.

The update processing of the application will be described for the following two cases: a case in which the application held and executed in the input device 300 is updated and the updated application operates normally; and a case in which the application does not operate normally.

Update Processing of Application (Case in which New Application Operates Normally)

First, a description will be made below for the case in which an update of the application executed in the input device 300 is carried out and the updated application (new application) operates normally. FIGS. 5 and 6 are diagrams showing the flow of the processing when the update processing of the application of the input device 300 is executed in the tablet information terminal 1. As shown in FIGS. 5 and 6, the left side of the dotted line shows the flow of control by the update control software executed by the information processing device part 100 and the right side of the dotted line shows the flow of control by the activation program group and the application executed in the input device 300.

The activation program group includes the update program, the recovery program, and the activation program. FIGS. 7A to 7F are diagrams showing the states of the non-volatile memory 313 when the processing of FIGS. 5 and 6 is executed. The following description is based on the assumption that the input device 300 is in a normal operating state ((c) in FIG. 4). Specifically, it is based on the assumption that, as shown in FIG. 7A, the input device 300 is equipped with firmware including an application that has been already normally activated and the activation flag and the update settlement flag are both set to "On" ("0" or "programmed").

When the tablet information terminal 1 is powered on, power is also supplied to the display device 200 and the input device 300. In the input device 300, the activation program stored in the activation program group storage area 31 is called by the CPU 311 (step S1) and the activation program is executed (step S2). The CPU 311 checks the flag information of the activation flag area 32B and the update settlement flag area 32C in the user area 32 by the function of the activation program and calls the application of the application area 32A (step S3) to execute the application (step S4).

Specifically, as denoted by the dotted box in FIG. 7A, the activation program is executed by the CPU 311 and then the application is executed by the CPU 311 by the function of the activation program. As described above, the application, which is the execution target in the present case, has operated normally, and the activation flag and the update settlement flag are both set to "On." Thus, the CPU 311 that has executed the activation program executes the application. Accordingly, as denoted by the double solid line in FIG. 7A, the CPU 311 that is executing the old application becomes the main controlling entity.

Suppose that, thereafter, the update control software for the application is executed by the CPU 102 of the information processing device part 100 and transmits a command to update the application of the input device 300 to the input device 300 (step S5). This example assumes that the update of the application is being carried out for the first time and, as shown in FIG. 7A, no data is stored in the application backup area 33 when the application is executed by the CPU 311.

The update start command from the update control software executed by the CPU 102 of the information processing device part 100 is received by the CPU 311 that is executing the application of the input device 300. In response to the update start command, the CPU 311 that is executing the application calls the update program stored in the activation program group storage area 31 (step S6) and executes the update program through the CPU 311 (step S7).

The update program executed by the CPU 311 has a communication processing function to enable communication with the information processing device part 100 to update the application. As shown in FIG. 7B, the CPU 311 that has executed the update program saves the application (old application) stored in the application area 32A in the application backup area 33 (step S8). Subsequently, as shown in FIG. 7C, the CPU 311 that has executed the update program erases all information stored in the user area 32 (step S9).

After the user area 32 has been erased, update data, (a new application) is provided by the information processing device part 100 (step S10). The CPU 311 that is executing the update program receives the new application and, as shown in FIG. 7D, writes the new application to the application area 32A, which is the application activation target area (step S11). When the processing of steps S1 to S11 has been completed, the activation flag of the activation flag area 32B and the update settlement flag of the update settlement flag area 32C are both set to the "Off" ("initial") state.

Upon the completion of the provision of the new application, a reset command (software reset) is transmitted by the information processing device part 100 (step S12). The CPU 311 receives the reset command and calls the activation program from the activation program group storage area 31 instead of the update program (step S13) to execute the activation program (step S14).

Because the activation flag and the update settlement flag are both in the "Off" state, the CPU 311 that has executed the activation program determines that activation of the new application of the activation target is a first activation. In this case, the CPU 311 that has executed the activation program calls the new application (step S15) to execute the new application (step S16). In addition, the CPU 311 sets the activation flag of the activation flag area 32B to "On" (step S17). Although the activation of the new application and the processing of setting the activation flag to "On" are described as a series of processing here, the new application may also be executed after the activation flag is turned to "On."

As described above, after the reception of the reset command, the activation program is activated by the CPU 311, as denoted by the dotted box in FIG. 7E. Thereafter, the application is read out to be executed by the CPU 311 by the function of the activation program. Accordingly, as denoted by the double solid line in FIG. 7E, the CPU 311 that is executing the new application becomes the main entity of control.

Thereafter, a touch operation (Tc1) from a user is accepted via the input device 300 through the new application executed by the CPU 311. In the input device 300, the new application executed by the CPU 311 executes touch input processing (step S18) and detects the position of the user's touch. Then, the input device 300 supplies the touch position as operation information to the information processing device part 100 via the I/O port 120 (step S19).

The update control software being executed in the information processing device part 100 executes processing to confirm that the input device 300 has operated normally based on the information from the input device 300 (step S20). If normal operation can be confirmed, the update control software being executed in the information processing device part 100 forms an update settlement command and provides the update settlement command to the input device 300 via the I/O port 120 (step S21).

Upon receiving the update settlement command from the information processing device part 100, the CPU 311 that is executing the new application calls the update program of the activation program group storage area 31 (step S22) to execute it (step S23) instead of the new application. As shown in FIG. 7F, the CPU 311 that has executed the update program sets the update settlement flag of the update settlement flag area 32C to "On" (step S24).

Thereafter, a reset command (software reset) is transmitted from the information processing device part 100 that has transmitted the update settlement command (step S25). Accordingly, the CPU 311 that has received the reset command calls and executes the new application by the function of the activation program executed by the CPU 311, as shown in the steps S1 to S4 of FIG. 5. In this case, the new application whose normal operation has been confirmed may be executed.

Suppose that, as above, the new application functions normally, even when the application of the input device 300 has been updated from an old application to a new application. In this case, the input device 300 that functions according to the new application functions properly as the input equipment of the tablet information terminal 1.

Furthermore, if the updated new application has functioned normally, the activation flag and the update settlement flag are both set to "On" to indicate that the activated new application has operated normally. Thus, the touch input device, itself, can determine that recovery processing of the application is unnecessary, without assistance by the information processing device. In contrast, if the activation flag is "On" and the update settlement flag is "Off," the updated new application has been activated but has not operated normally. Thus, the touch input device, itself, can determine that the recovery processing of the application is necessary, without assistance by the information processing device.

Update Processing of Application (Case in which New Application does not Normally Operate)

Next, a description will be made below for the case in which an update of the application executed in the input device 300 is carried out but the updated application (new application) does not operate normally. FIG. 8 is a diagram showing the flow of the processing when the update processing of the application of the input device 300 is executed in the tablet information terminal 1. Similar to the case shown in FIGS. 5 and 6, the left side of the dotted line of FIG. 8 shows the flow of control by the update control software for the application that is executed in the information processing device part 100, and the right side of the dotted line shows the flow of control by the activation program group and the application executed in the input device 300. FIGS. 9E and 9G to 9J are diagrams showing the states of the non-volatile memory 313 when the processing of FIG. 8 is executed.

It cannot be known whether or not a new application operates normally after an update of the application until the new application is written to the application area 32A and is actually executed. Thus, even when the application after the update (new application) involves a defect, as shown in FIG. 8, the processing of the steps S1 to S17 shown in FIGS. 5 and 6 is executed as described with reference to FIGS. 5 and 6. Therefore, by the processing of the steps S1 to S17 shown in FIGS. 5 and 6, the state of the non-volatile memory 313 of the input device 300 becomes the state that is shown in FIGS. 7E and 9E. That is, FIGS. 7E and 9E show the same state of the non-volatile memory 313.

Specifically, similar to the case of FIGS. 5 and 6, the application before the update (old application) is saved in the application backup area 33 (FIG. 9E) by the processing steps of S1 to S17. Furthermore, the application after the update (new application) is stored in the application area 32A (FIG. 9E).

Moreover, the new application stored in the application area 32A is called and executed by the CPU 311 that is executing the activation program. Specifically, the new application is executed by the CPU 311 and information indicating that the new application has been activated is stored in the activation flag area 32B by the activation program (FIG. 9E).

Due to the execution of the new application stored in the application area 32A by the CPU 311, as denoted by the double solid line in FIG. 9G, the CPU 311 that is executing the new application becomes the main entity of control. Suppose that, thereafter, as denoted by hatching in FIG. 9G, the new application involves abnormality and becomes incapable of normal operation even though the new application executed by the CPU 311 continues to be operated by the CPU 311 (step S31). In this case, touch operation from the user is also not accepted and the touch operation (Tc2) becomes impossible.

Therefore, operation information detected by the function of the application software is not transmitted from the input device 300 to the information processing device part 100. Furthermore, an update settlement command is also not transmitted from the information processing device part 100. Thus, as shown in FIG. 9G, information indicating that the new application has operated normally is also not written to the update settlement flag area 32C.

When the update control software executed by the CPU 102 of the information processing device part 100 does not receive the operation information from the input device 300 that has updated the application within a predetermined time, a time-out state occurs (step S32). As a result, the update control software transmits, via the I/O port 120, a reset command to the input device 300 to order a re-activation of the firmware (step S33). However, because the new application is not functioning normally, the reset command results in an error and the new application cannot be re-activated through the activation program.

For this reason, the update control software being executed by the CPU 102 of the information processing device part 100 interrupts the processing (step S34). In this case, because the input device 300 does not function normally, the tablet information terminal 1, in which the input device 300 is sole input equipment, becomes completely inoperable.

Consequently, the user of the tablet information terminal 1 attempts to reboot the input device 300. For example, the user carries out an operation of turning off the main power supply of the tablet information terminal 1 and turning it on again (hardware reset) (Tc3). When the tablet information terminal 1 is powered on again, the information processing device part 100, the display device 200, and the input device 300 are also powered on. Thereafter, in the input device 300, the activation program of the activation program group storage area 31 is called by the CPU 311 (step S35) to be executed by the CPU 311 (step S36).

The CPU 311 that has executed the activation program then refers to the activation flag of the activation flag area 32B and the update settlement flag of the update settlement flag area 32C in the user area 32 during the activation state, and determines whether the application is executable (i.e., whether recovery processing is necessary). The state of the non-volatile memory 313 at this timing is shown in FIG. 9H. This state is the same as that shown in FIG. 9G except that the activation program is being executed by the CPU 311.

That is, the activation flag of the activation flag area 32B in the user area 32 is set to "On" but the update settlement flag of the update settlement flag area 32C is set to "Off." This state corresponds to (b) shown in FIG. 4. From this state it can be determined that recovery processing of the application needs to be executed. Therefore, the CPU 311 in which the activation program is executed calls the recovery program (step S37) and executes the recovery program (step S38) to execute the recovery processing of the application.

As a result, as shown by surrounding by a double solid line in FIG. 9I, the CPU 311 that is executing the recovery program becomes the main entity of control. As shown in FIG. 9I, the CPU 311 that has executed the recovery program writes the application, which was used before the update (old application) and is saved (backed up) in the application backup area 33, to the application area 32A in the user area 32. The old application has a track record of normal operation. Next, the CPU 311 that has executed the recovery program sets both the activation flag of the activation flag area 32B and the update settlement flag of the update settlement flag area 32C to "On."

Thereafter, as shown in FIG. 9J, the CPU 311 that is executing the recovery program calls the old application, which is returned (recovered) to the application area 32A (step S39), to execute it (step S40). Thereby, the input device 300 of the tablet information terminal 1 can execute touch input processing by the old application, which has operated normally, and functions normally as the input equipment of the tablet information terminal 1.

In this manner, even when the application after the update (new application) involves a defect and does not operate normally, the CPU 311 of the input device 300 autonomously executes the recovery processing of the apparatus by executing the recovery program and avoids a state in which the tablet information terminal 1 becomes completely non-functional.

Case in which Update of Application has not been Completed

In the above-described embodiment, an update has completed normally, but a new application involves a defect and does not function normally. However, the state in which the new application does not function normally may also occur when all of the new application is not written to the application area 32A. For example, if the main power supply of the tablet information terminal 1 is turned off during the process of writing the new application to the application area 32A for any reason, a state in which the writing of the new application to the application area 32A has not been completed and the new application does not function normally may occur.

To address this issue, the CPU 311 that is executing the activation program determines the state of writing of the application to the application area 32A by the function of the activation program. When the CPU 311 that is executing the activation program determines that the writing of the application to the application area 32A is incomplete, the CPU 311 executes the recovery program, instead of the activation program, to execute the above-described recovery processing of the application. Thereafter, the CPU 311 executes the activation program to execute activation processing of the application. Therefore, the case in which writing of the application to the application area 32A is incomplete and the input device 300 becomes non-functional can be avoided.

FIGS. 10A to 10D are diagrams for explaining one example of a method for determining whether or not writing of the application to the application area 32A is incomplete. As shown in FIGS. 10A to 10D, in the application area 32A of the user area 32, the application is written from the beginning (upper end part) of the application area 32A toward the ending (lower end part) thereof. Before the writing of the application, a state in which the whole of the application area 32A has been initialized is made.

Figure 10A:
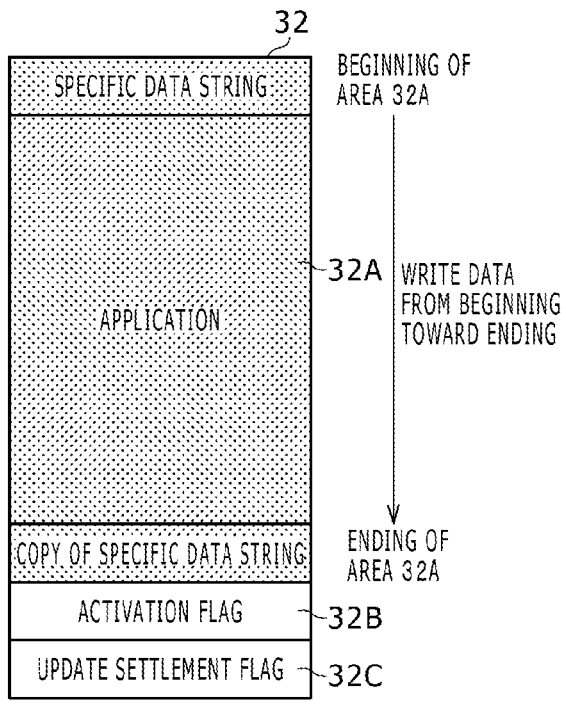
FIGS. 10A to 10D are diagrams for explaining one example of a method for determining whether or not writing of the application to the corresponding area in a user area is incomplete.

When the application is written to the application area 32A, as shown in FIG. 10A, a specific data string prescribed in advance is written to the beginning part of the application area 32A first, followed by the writing of the application. Then, if all of the application has been normally written, the activation program copies the specific data string written to the beginning part of the application area 32A into the ending part of the application area 32A.

Figure 10B:
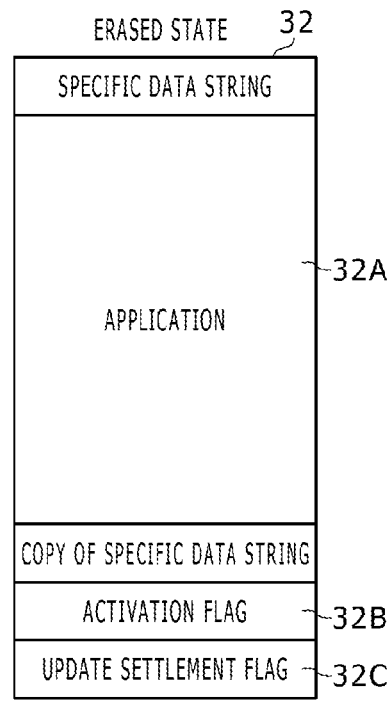
Figure 10C:
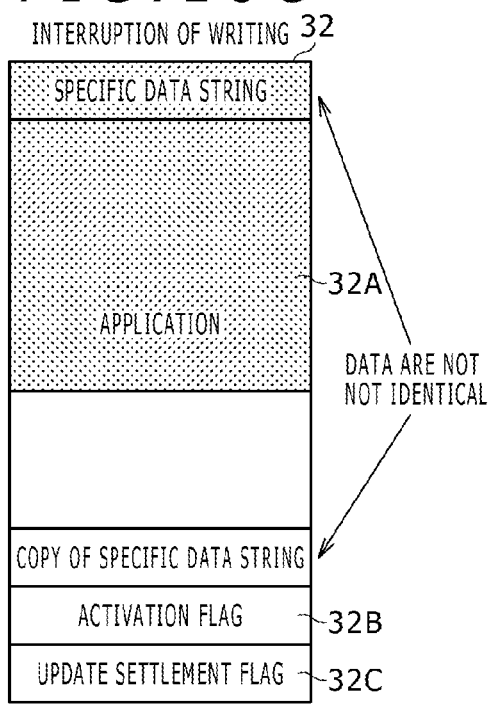

If this is employed, it can be determined whether or not the application has been properly written to the application area 32A based on whether or not the same specific data string exists at the beginning part and ending part of the application area 32A. For example, suppose that the process of writing the application to the application area 32A is started from a state in which no data is written to the user area 32 as shown in FIG. 10B and the writing of the application is interrupted halfway as shown in FIG. 10C. In this case, the same specific data string at the beginning part of the application area 32A does not exist at the ending part thereof. Thus, it can be determined that the application has not been written normally to the application area 32A.

Figure 10D:
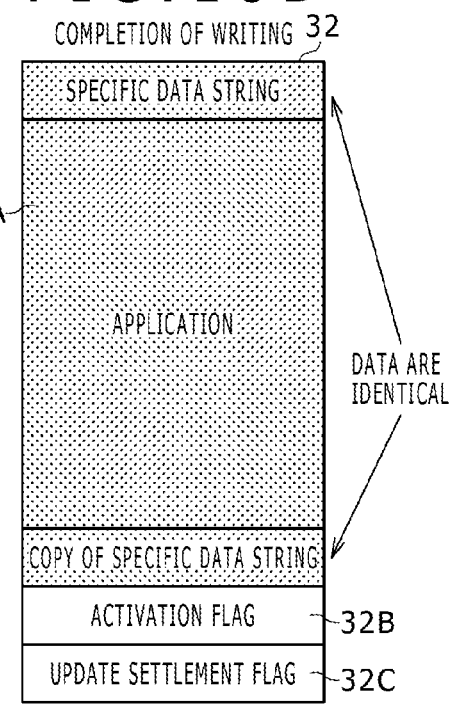

In contrast, suppose that processing of writing the application to the application area 32A is started from a state in which no data is written to the user area 32 as shown in FIG. 10B and the writing of the application is completed to the end as shown in FIG. 10D. In this case, the same specific data string exists at the beginning part and the ending part of the application area 32A. Thus, it can be determined that the application has been written normally. Furthermore, at the time of the state of FIG. 10C, processing for recovering the application stored in the application backup area 33 to the application area 32A is executed.

In addition, when the application after update (new application) has not been written normally to the application area 32A, this can be automatically recovered on the side of the input device 300.

The method for determining whether or not writing of the application to the application area 32A has been completed normally, described by using FIGS. 10A to 10D, is merely one example. For example, it is also possible to use a method in which it is determined whether or not writing of the application has been completed based on whether or not data has been written with a final address that is not in an erased state. Alternatively, a method may be used in which the accuracy of writing of the new application is checked by using a check sum that is obtained before and after the writing of the new application. It is also possible to use an existing error detection method, such as a redundancy check, a parity check, a hamming code check, a cyclic redundancy check (CRC), an improved method of them, a newly devised check system, or the like.

Activation Processing (Including Recovery Processing) of Application

Next, with reference to a flowchart of FIG. 11, a description will be made about activation processing, including recovery processing, of the application executed by the activation program and the recovery program executed by the CPU 311 of the input device 300 of this embodiment.

Figure 11:
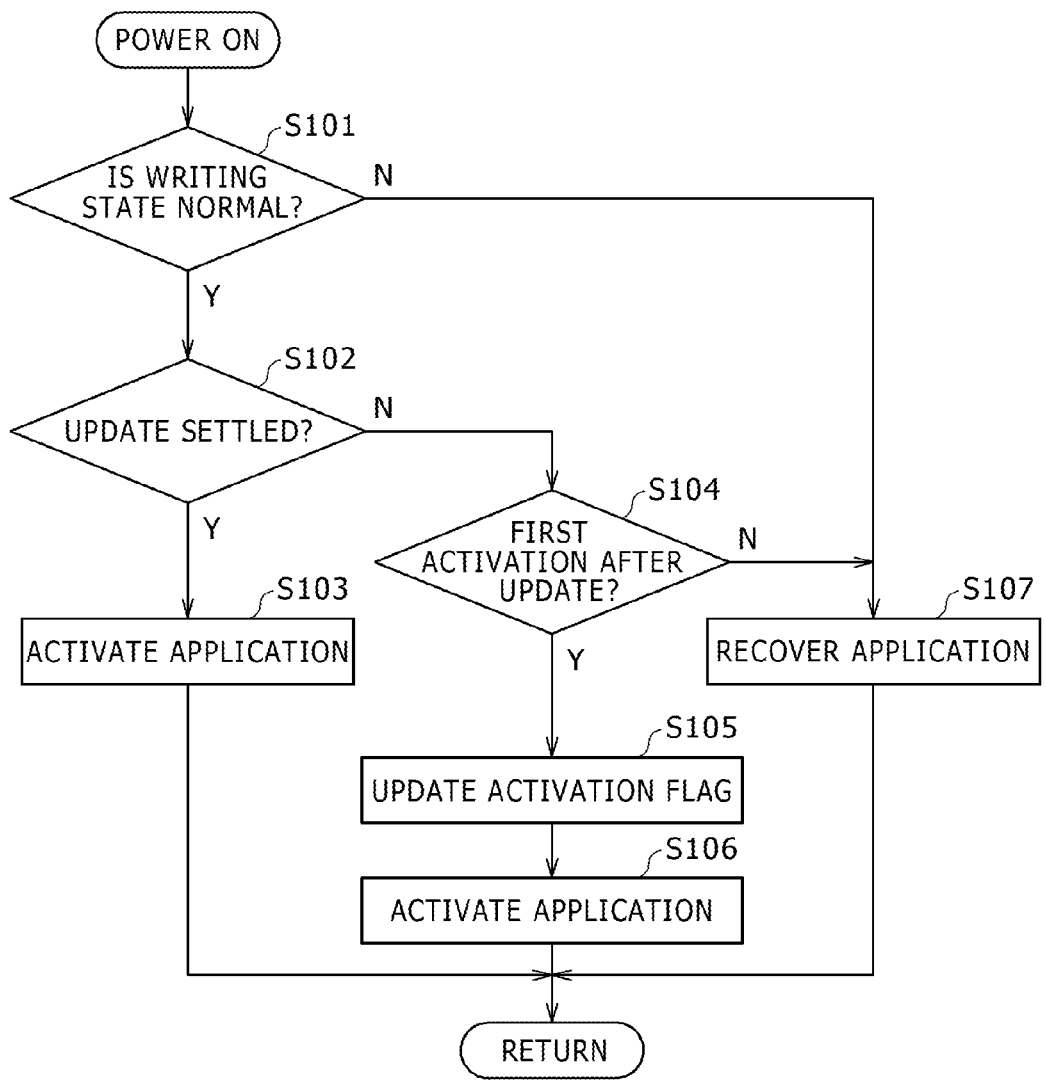
FIG. 11 is a flowchart for explaining activation processing of the application (including recovery processing of the application) executed by a CPU.

FIG. 11 is a flowchart for explaining the activation processing, including recovery processing, of the application executed by the activation program and the recovery program executed by the CPU 311 of the input device 300. The flowchart shown in FIG. 11 is focuses on the processing when the application is activated (i.e., the processing described by using FIGS. 5 to 9J, except the update processing of the application).

The CPU 311 of the input device 300 of the tablet information terminal 1 is powered on and executes the processing shown in FIG. 11. In the input device 300, the CPU 311 then executes the activation program and determines whether or not the application has been written normally to the application area 32A in the non-volatile memory 313 (step S101). The processing of step S101 checks whether or not all of the application has been recorded normally in the application area 32A by using, for example, the method described with reference to FIGS. 10A to 10D or another check method by the function of the activation program.

When it is determined that the application has been written normally to the application area 32A in the determination processing of step S101, the CPU 311 determines whether or not an update of the application has been settled (step S102). The processing of step S102 determines whether or not the activation flag of the activation flag area 32B and the update settlement flag of the update settlement flag area 32C are both set to "On" by the function of the activation program.

Suppose that, in the determination processing of step S102, it is determined that the activation flag and the update settlement flag are both set to "On" (i.e., the activation state is the third state (c)) and the update of the application has been settled (confirmed). In this case, the CPU 311 that is executing the activation program activates the application stored in the application area 32A by the CPU 311 (step S103) and ends the processing as shown in FIG. 11. The processing of step S103 changes the main entity of control from the CPU 311 in which the activation program is executed to the CPU 311 in which the application is activated, so that the input device 300 functions as the input equipment of the tablet information terminal 1.

Alternatively, suppose that it is determined that the update of the application has not been settled in step S102. In this case, the CPU 311 that is executing the activation program determines whether or not the present activation of the application of the application area 32A is a first activation (step S104). That is, the determination processing of step S104 determines whether or not the updated application has never been activated after the update. Specifically, in step S104, it is checked whether or not the activation flag of the activation flag area 32B and the update settlement flag of the update settlement flag area 32C are both set to "Off" (i.e., whether or not the activation state is the first state (a)).

Suppose that, in the determination processing of the step S104, it is determined that the activation flag and the update settlement flag are both set to "Off" and the present activation of the application of the application area 32A is a first activation (i.e., the application has never been activated). In this case, the CPU 311 that is executing the activation program sets the activation flag of the activation flag area 32B to "On" (step S105). Thereafter, the CPU 311 that is executing the activation program activates the application stored in the application area 32A (step S106).

The processing of this step S106 changes the main entity of control from the CPU 311 in which the activation program is executed to the CPU 311 in which the application is activated, so that the input device 300 functions as the input equipment of the tablet information terminal 1. In step S106, if the activated application operates normally, the update settlement flag is set to "On" by the update program executed by the CPU 311 as described above. If the activated application does not operate normally, the update settlement flag is not set to "On" and, therefore, recovery processing of the application is executed through a hardware reset by power re-activation as described above.

As another case, suppose that, in the determination processing of step S101, the CPU 311 that is executing the activation program determines that the application has not been written normally to the application area 32A. In this case, the CPU 311 executes the recovery program to execute the recovery processing of the application (step S107). Similarly, suppose that, in the determination processing of the step S104, the CPU 311 that is executing the activation program determines that the application of the application area 32A has already been activated. The CPU 311 executes the recovery program to execute the recovery processing of the application (step S107).

In the step S107, (1) the CPU 311 that has executed the recovery program stores the old application saved in the application backup area 33 in the application area 32A again. In addition, (2) the CPU 311 that has executed the recovery program sets the activation flag of the activation flag area 32B to "On" and sets the update settlement flag of the update settlement flag area 32C to "On."

Thereafter, for example, in response to a reset command provided from the information processing device part 100, the CPU 311 of the input device 300 executes the activation program to activate the recovered old application. The activation processing in this case is the same as the activation processing of the application as described in step S103.

As described above, in the input device 300, the application for allowing the input device 300 to function as the input equipment is stored in the non-volatile memory 313 of the input device 300. The stored application is treated as a target of update. In some cases, the update is not normally completed or the updated application does not function normally.

However, the CPU 311 of the input device 300 executes only the application that has operated normally by the function of the activation program. Furthermore, if trouble is caused during the update processing of the application or the application itself, the CPU 311 of the input device 300 can autonomously recover the application by the functions of the activation program and the recovery program. The recovery processing can be executed by being triggered by a hardware reset operation in which the tablet information terminal 1 is powered off and then powered on again.

Modification Examples and Others

As described above, the application includes the touch processing program and the program of communication processing and others. In the above-described embodiment, it is explained that the CPU 311 of the input device 300 recovers the application by being triggered by a power-on/off (hardware reset), even when trouble is caused in the program of communication processing and others, and recovery from the information processing device part 100 is impossible. However, this configuration is not limited thereto.

For example, suppose that the touch processing program of the application involves a defect and detection of a touch position is impossible, but the program of communication processing and others functions normally. In this case, a reset command provided from the information processing device part 100 in step S33 of FIG. 8 can be properly received. Therefore, when receiving the reset command due to a time-out state, the CPU 311 can execute the processing from step S35 of FIG. 8 to call and execute the activation program.

In this case, a hardware reset, such as a power-on/off of the tablet information terminal 1, does not have to be employed as a trigger for execution of the activation program leading to recovery processing. That is, the reset command (software reset) of the step S33 of FIG. 8 can be employed as the trigger for execution of the activation program leading to the recovery processing.

In the above-described embodiment, it is also explained that the CPU 311 that has executed the activation program executes the application stored in the application area 32A of the user area 32. Therefore, the recovery processing of the application includes processing of writing to write back an old application saved in the application backup area 33 to the application area 32A. However, this configuration is not limited thereto.

If the application is free from address dependence and the CPU 311 of the input device 300 can execute a program free from address dependence, the CPU 311 may directly execute the old application in the application backup area 33 for the recovery processing. In this case, the processing of writing back the old application to the application area 32A does not need to be executed.

In the above-described embodiment, it is also explained that the activation program, the update program, and the recovery program are stored in the activation program group storage area 31 of the non-volatile memory 313 and are not treated as the update target. However, this configuration is not limited thereto. Because the activation program, the update program, and the recovery program are not treated as the update target, they may be recorded in a mask ROM provided in the input device 300.

In the description of FIG. 11, the activation state of the first state to the third state is determined in order of S102 and S104. However, this order may be reversed. Alternatively, the activation state may be determined in a single step.

Embodiments of the present invention are particularly useful as a controller of an input sensor such as a touch sensor, but the input sensor is not limited to a touch sensor. For example, controllers of the present invention may be used to control alternative input sensors, such as pen input sensors, which may be used in future mobile terminals.

It should be understood by those skilled in the art that various modifications, combinations, sub-combinations and alterations may occur depending on design requirements and other factors insofar as they are within the scope of the appended claims or the equivalents thereof. The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A sensor controller configured to control a sensor device that provides input information to a computer, the sensor controller comprising:
    a non-volatile memory that stores:
        application software configured to accept and process touch input,
        an activation program configured to check an activation state of the application software,
        a recovery program configured to execute recovery processing for the application software, and
        information indicating the activation state; and
    a processor configured to:
        execute the activation program,
        execute the application software if the activation state indicates that an activation of the application software is a first activation of the application software,
        change the activation state to indicate that the touch input has been processed by the application software without resulting in an error if the activation state indicates that the activation of the application software is the first activation of the application software and a response to the input information provided to the computer is received from the computer, and
        execute the recovery program if the activation state indicates that the activation of the application software is a subsequent activation of the application software and indicates that the touch input has not been processed by the application software without resulting in an error at a time of a past activation of the application software.

2. The sensor controller according to claim 1, wherein the information indicating the activation state includes an activation flag that indicates whether the activation of the application software is the first activation of the application software or is the subsequent activation of the application software, and an update settlement flag that indicates whether the touch input has been processed by the application software without resulting in an error at the time of the past activation of the application software.

3. The sensor controller according to claim 1, wherein the activation program and the recovery program are stored in an area of the non-volatile memory that is not an update target.

4. The sensor controller according to claim 1, wherein the non-volatile memory further stores an update program configured to execute update processing of the application software in response to a provision of new application software.

5. The sensor controller according to claim 4, wherein the activation program, the recovery program, and the update program are stored in an area of the non-volatile memory that is not an update target.

6. The sensor controller according to claim 1, wherein the non-volatile memory further stores old application software that has previously operated without resulting in an error in a predetermined area of the non-volatile memory, and the recovery processing treats the old application software as an activation target and sets the activation state to a state that indicates the activation of the application software is the subsequent activation of the application software and indicates the touch input has been processed by the application software without resulting in an error.

7. The sensor controller according to claim 1, wherein the non-volatile memory further stores old application software that has previously operated without resulting in an error in a predetermined area of the non-volatile memory, and stores the application software in an application activation target area of the non-volatile memory, and the processor executes the application software through the activation program, and the recovery processing moves the old application software to the application activation target area and sets the activation state to a state that indicates the activation of the application software is a subsequent activation of the application software and indicates the touch input has been processed by the application software without resulting in an error at the time of the past activation of the application software.

8. A sensor controller configured to control a sensor device that provides input information to a computer, the sensor controller comprising:
    a non-volatile memory that stores:
        application software configured to provide the input information to the computer,
        an activation program configured to determine an activation state of the application software,
        a recovery program configured to execute recovery processing to recover the application software, and information indicating the activation state, the activation state including a first state, a second state, and a third state, the first state being a state in which activation of the application software is a first activation of the application software, the second state being a state in which activation of the application software is a subsequent activation of the application software and in which there is no information indicating that the application software has been executed without resulting in an error in a previous activation of the application software, the third state being a state in which activation of the application software is the subsequent activation of the application software and in which information exists indicating that the application software has been executed without resulting in an error in a previous activation of the application software; and a processor configured to:
  execute the activation program,
  determine the activation state,
  execute the recovery program if the activation state is the second state,
  execute the application software if the activation state is the first state at a time of activation of the application software, and
  change the activation state from the first state to the third state if the activation state is the first state at the time of activation of the application software and the processor detects that the application software has been executed without resulting in an error by receiving a response to the input information from the computer.

9. The sensor controller according to claim 8, wherein the non-volatile memory further stores an update program configured to update the application software, and the processor sets the activation state to the first state when the update program is executed.

10. The sensor controller according to claim 9, wherein the processor sets the activation state to the first state in association with an erasure of the application software.

11. The sensor controller according to claim 8, wherein the recovery program changes the activation state from the second state to the third state in association with the recovery processing.

12. The sensor controller according to claim 9, wherein the first state, the second state, and the third state are represented by two flags, the two flags being changed to the first state in association with execution of the update program.

13. The sensor controller according to claim 12, wherein the non-volatile memory is a flash memory that carries out an erasure operation on a storage area in units of pages or blocks, the two flags are held in a same page or block, the first state is indicated by an erasure of the same page or block, and the second state is indicated by one of the two flags being programmed to be ON.

14. An application software recovery method for a sensor controller, the sensor controller including a non-volatile memory and a processor, the memory storing: (i) application software configured to accept and process touch input, (ii) an activation program configured to check an activation state of the application software at a time of power activation, (iii) a recovery program configured to execute recovery processing of the application software, and (iv) an activation flag and an update settlement flag, the activation flag indicating whether activation of the application software is a first activation of the application software or a subsequent activation of the application software, the update settlement flag indicating the activation state representing whether or not the touch input has been processed by the application software without resulting in an error at a time of a past activation of the application software, the processor configured to execute the activation program, the recovery program, and the application software, the application software recovery method comprising:
  executing, by the processor, the activation program at the time of power activation;
  checking, by the processor, the activation state through the activation program;
  executing, by the processor, the recovery program if the checking of the activation state indicates that an activation of the application software is a subsequent activation of the application software and the touch input has not been processed by the application software without resulting in an error at the time of the past activation of the application software; and
  storing old application software that has previously operated without resulting in an error in a predetermined area in the non-volatile memory, the recovery processing including treating the old application software as an activation target and setting the activation state to a state that indicates activation of the application software is the subsequent activation of the application software and the touch input has been processed by the application software without resulting in an error.

15. The application software recovery method according to claim 14, further comprising:
  storing old application software that has previously operated without resulting in an error in a predetermined area in the non-volatile memory, the processor further configured to execute application software stored in an application activation target area in the non-volatile memory through the activation program, the recovery processing including moving the old application software to the application activation target area and setting the activation state to a state that indicates activation of the application software is the subsequent activation of the application software and the touch input has been processed by the application software without resulting in an error at the time of the past activation of the application software.

16. A sensor controller configured to control a sensor device that provides input information to a computer, the sensor controller comprising:
  a non-volatile memory that stores:
    application software configured to accept and process touch input,
    an activation program configured to check an activation state of the application software,
    a recovery program configured to execute recovery processing for the application software, and
    information indicating the activation state; and
  a processor configured to:
    execute the activation program, and
    execute the recovery program if the activation state indicates that the activation of the application software is a subsequent activation of the application software and indicates that the touch input has not been processed by the application software without resulting in an error at a time of a past activation of the application software,
  wherein the non-volatile memory further stores old application software that has previously operated without resulting in an error in a predetermined area of the non-volatile memory, and the recovery processing treats the old application software as an activation target and sets the activation state to a state that indicates the activation of the application software is the subsequent activation of the application software and indicates the touch input has been processed by the application software without resulting in an error.

17. A sensor controller configured to control a sensor device that provides input information to a computer, the sensor controller comprising:
a non-volatile memory that stores
application software configured to provide the input information to the computer,
an activation program configured to determine an activation state of the application software,
a recovery program configured to execute recovery processing to recover the application software, and
information indicating the activation state, the activation state including a first state, a second state, and a third state, the first state being a state in which activation of the application software is a first activation of the application software, the second state being a state in which activation of the application software is a subsequent activation of the application software and in which there is no information indicating that the application software has been executed without resulting in an error in a previous activation of the application software, the third state being a state in which activation of the application software is the subsequent activation of the application software and in which information exists indicating that the application software has been executed without resulting in an error in a previous activation of the application software; and
a processor configured to execute the activation program and determine the activation state, and execute the recovery program if the activation state is the second state,
wherein the non-volatile memory further stores an update program configured to update the application software, and the processor sets the activation state to the first state when the update program is executed, and
wherein the processor sets the activation state to the first state in association with an erasure of the application software.

18. A sensor controller configured to control a sensor device that provides input information to a computer, the sensor controller comprising:
a non-volatile memory that stores:
application software configured to provide the input information to the computer,
an activation program configured to determine an activation state of the application software,
a recovery program configured to execute recovery processing to recover the application software, and
information indicating the activation state, the activation state including a first state, a second state, and a third state, the first state being a state in which activation of the application software is a first activation of the application software, the second state being a state in which activation of the application software is a subsequent activation of the application software and in which there is no information indicating that the application software has been executed without resulting in an error in a previous activation of the application software, the third state being a state in which activation of the application software is the subsequent activation of the application software and in which information exists indicating that the application software has been executed without resulting in an error in a previous activation of the application software; and
a processor configured to execute the activation program and determine the activation state, and execute the recovery program if the activation state is the second state,
wherein the recovery program changes the activation state from the second state to the third state in association with the recovery processing.

19. A sensor controller configured to control a sensor device that provides input information to a computer, the sensor controller comprising:
a non-volatile memory that stores:
application software configured to provide the input information to the computer,
an activation program configured to determine an activation state of the application software,
a recovery program configured to execute recovery processing to recover the application software, and
information indicating the activation state, the activation state including a first state, a second state, and a third state, the first state being a state in which activation of the application software is a first activation of the application software, the second state being a state in which activation of the application software is a subsequent activation of the application software and in which there is no information indicating that the application software has been executed without resulting in an error in a previous activation of the application software, the third state being a state in which activation of the application software is the subsequent activation of the application software and in which information exists indicating that the application software has been executed without resulting in an error in a previous activation of the application software; and
a processor configured to execute the activation program and determine the activation state, and execute the recovery program if the activation state is the second state,
wherein the non-volatile memory further stores an update program configured to update the application software, and the processor sets the activation state to the first state when the update program is executed, and
wherein the first state, the second state, and the third state are represented by two flags, the two flags being changed to the first state in association with execution of the update program.

* * * * *